Feb. 15, 1938.  W. E. AMBERG  2,108,701

MECHANICAL SEAL

Filed July 13, 1936

Witnesses:

Inventor:
Walter E. Amberg

Patented Feb. 15, 1938

2,108,701

UNITED STATES PATENT OFFICE 2,108,701

MECHANICAL SEAL

Walter Edward Amberg, Chicago, Ill., assignor to Fred Milton Friedlob, Chicago, Ill.

Application July 13, 1936, Serial No. 90,309

2 Claims. (Cl. 286—11)

My invention relates to improvements in mechanical seals that are used to prevent leakage of liquids through bearings where shafts protrude into liquid containing chambers and where such shaft protrusion and seals are completely submerged in the liquid.

The object of my invention is to provide an auxiliary force to hold the sealing surfaces together under rotation.

It is a special object of my invention, in holding the sealing surfaces together under rotation, to provide an auxiliary force unaffected by the vibration and oscillation of the seal and shaft under worn condition of the bearing.

Figure 1:
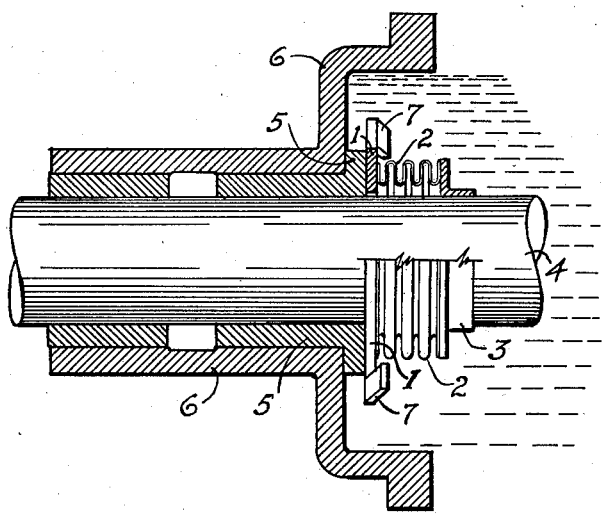
Figure 2:
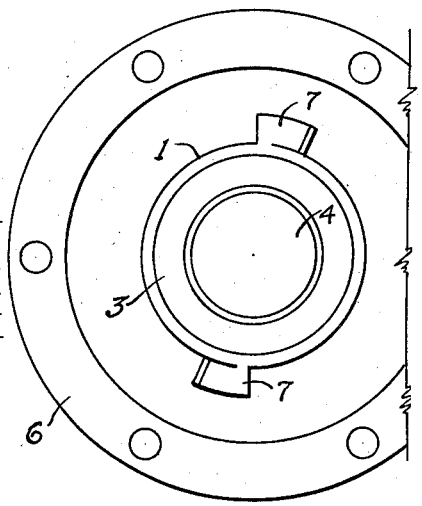
Figure 3:
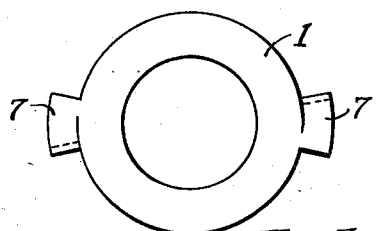
Figure 4:
Figure 5:
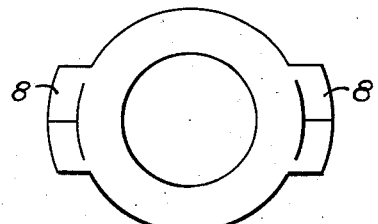
Figure 6:

I attain these objects by the auxiliary sealing force obtained from the liquid in which the seal is submerged by means of a propeller vane periphery of the rotating sealing face, and illustrated by the mechanism in the accompanying drawing in which:

Fig. 1 is a part sectional view of a bearing box with its shaft protruding into liquid, and having mounted thereon a typical seal completely submerged by liquid: Fig. 2 is an end view of Fig. 1: Fig. 3 is a plan view of the sealing member of the seal showing its integral vane blades of one direction type: Fig. 4 is a side view of Fig. 3: Fig. 5 is a plan view of the sealing member of the seal showing its integral vane blades of double direction type: Fig. 6 is a side view of Fig. 5.

Similar numerals refer to similar parts throughout the several views.

The seal proper consists of three integral parts: a floating sealing member 1, a flexible tube spring 2, and a rigid member 3. Through member 3, the seal proper is made integral with shaft 4 with a press fit or other commercial means.

Opposing the rotating sealing member 1, of the seal proper, is the stationary sealing faced bushing 5, which is mounted in the bearing box 6.

On the periphery of the sealing member 1, are mounted integral thereon, the vane blades 7 for single direction of rotation or vane blades 8 of Figs. 5 and 6 for applications where both directions of rotation are required.

Upon rotation, the vane blades 7, acting as propellers in the liquid, hold the sealing surfaces of members 1 and 5 together by a force unaffected by the vibrations of the seal proper and the shaft.

The seal chosen in the illustration as typical for applicaton of my invention, does not confine its use to this type solely as it is equally applicable to all submerged sealing devices employing a rotating sealing face.

As modifications of my invention will readily suggest themselves to one skilled in the art, I do not limit or confine my invention to the specific structures herein shown and described, nor do I wish to confine my invention to applications of straight faced seals as it is equally applicable to curved and tapered faced seals.

I claim:

1. A sealing device for a rotary shaft comprising a stationary bushing surrounding the shaft, a thrust bearing plate surrounding the shaft adapted to engage one end of the bushing to establish a seal therewith and having a pitched propeller blade adapted when the bearing plate is rotated to act upon a fluid in which said device is immersed to advance the bearing plate against the proximate bushing end, and a flexible sealing and driving connection between the plate and shaft whereby the former is caused to rotate with the latter.

2. In a bearing for rotary shafts having a stationary bearing surface surrounding said shaft, a ring-like thrust bearing plate also surrounding said shaft for frictional sealing engagement with said surface, a thrust tube spring surrounding said shaft and having its opposite ends connected to said shaft and plate respectively to provide a flexible seal and driving connection between said shaft and plate, and said plate having propeller blades arranged about the periphery thereof to act upon a fluid in which said device is submerged and supplement the thrust action of said spring in holding said plate and surface in sealing engagement.

WALTER EDWARD AMBERG.